United States Patent
Zhou et al.

(10) Patent No.: US 12,220,685 B2
(45) Date of Patent: Feb. 11, 2025

(54) SOLID-PHASE EXTRACTION MATERIAL, AND PREPARATION METHOD AND USE THEREOF

(71) Applicant: NANJING UNIVERSITY, Nanjing (CN)

(72) Inventors: Qing Zhou, Nanjing (CN); Ziang Zhang, Nanjing (CN); Junxia Chen, Nanjing (CN); Yurong Chen, Nanjing (CN); Chongtian Lei, Nanjing (CN); Ranqiu Wang, Nanjing (CN); Weiwei Zhou, Nanjing (CN); Libin Zhang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/910,312

(22) PCT Filed: May 6, 2022

(86) PCT No.: PCT/CN2022/091097
§ 371 (c)(1),
(2) Date: Sep. 8, 2022

(87) PCT Pub. No.: WO2023/082566
PCT Pub. Date: May 19, 2023

(65) Prior Publication Data
US 2024/0207815 A1    Jun. 27, 2024

(30) Foreign Application Priority Data
Nov. 15, 2021    (CN) .................... 202111347253.2

(51) Int. Cl.
*B01J 20/26*    (2006.01)
*B01J 20/30*    (2006.01)
*C02F 1/26*    (2023.01)

(52) U.S. Cl.
CPC ......... *B01J 20/261* (2013.01); *B01J 20/3064* (2013.01); *B01J 20/3071* (2013.01);
(Continued)

(58) Field of Classification Search
CPC .. B01J 20/261; B01J 20/3064; B01J 20/3071; B01J 20/3078; C02F 1/26
See application file for complete search history.

(56) References Cited

FOREIGN PATENT DOCUMENTS

| CN | 102382227 A | 3/2012 |
|---|---|---|
| CN | 109942737 A | 6/2019 |

OTHER PUBLICATIONS

Notification of the First Office Action dated Mar. 14, 2022 issued for related Chinese patent application No. 202111347253.2.

*Primary Examiner* — James A Fiorito

(57) ABSTRACT

The present invention relates to the field of solid-phase extraction, and particularly to a solid-phase extraction material, and a preparation method and use thereof. The preparation method includes prepolymerizing the monomers N-vinylpyrrolidone and divinylbenzene in the presence of a chain transfer agent, adding prepolymer dropwise to an emulsion of monodispersed seed microspheres, swelling, and reacting to prepare white spheres; and functionalizing the white spheres, to obtain the solid-phase extraction material. The solid-phase extraction material prepared by the reaction has good spherical morphology, large specific surface area, and high ion exchange capacity. The prepared solid-phase extraction material functions in the separation and enrichment of PPCPs by means of a variety of forces with a high extraction rate. The extraction rate is basically maintained between 85% and 105%, and acidic, alkaline, neutral and amphoteric substances is capable of being selectively separated.

10 Claims, 2 Drawing Sheets

(52) U.S. Cl.
CPC ............. *B01J 20/3078* (2013.01); *C02F 1/26* (2013.01); *B01J 2220/445* (2013.01); *B01J 2220/50* (2013.01)

MCX

MAX

WCX

WAX

SOLID-PHASE EXTRACTION MATERIAL, AND PREPARATION METHOD AND USE THEREOF

TECHNICAL FIELD

The present invention relates to the field of solid-phase extraction, and in particular to a method for preparing a series of enhanced solid-phase extraction materials with a uniform particle size, and use thereof.

BACKGROUND

The performance of solid-phase extraction packing is a key factor affecting the extraction efficiency, and the functional groups contained in the solid-phase extraction packing realize the enrichment of compounds by means of forces. Solid-phase extraction packing include molecular polymer matrices, bonded silica gels, inorganic metal oxides and other enhanced solid-phase extraction packing. Among them, the enhanced solid-phase extraction packing has a variety of functional groups, which can achieve various forces to extract compound, thus having a broader scope of application than a solid-phase extraction column of a single functional group. An enhanced adsorbent extracts an analyte by its interaction with ions, and effectively retains uncharged species through hydrophobic and hydrophilic interactions, thereby presenting a combined mode of retention. Before chromatographic determination, such substances varying greatly in the physical and chemical properties can be eluted with different eluents. Enhanced ion exchange polymers can be divided into enhanced cation exchange adsorbents and enhanced anion exchange adsorbents according to their respective ionic bonding groups, and into strong ion exchange adsorbents and weak ion exchange sorbents according to the strength of their respective ionic bonding groups.

HLB solid-phase extraction cartridge from Waters has found wide use in the enrichment and separation of trace organics in water due to its hydrophilic and hydrophobic backbone, but still has a low extraction and recovery rate for many organics, especially charged substances in an aqueous solution. To this end, a series of enhanced products such as MCX (strong cation exchange solid-phase extraction material), MAX (strong anion exchange solid-phase extraction material), WCX (weak cation exchange solid-phase extraction material), and WAX (weak anion exchange solid-phase extraction material) are developed by Waters for use as a supplement. They are characterized by having a hydrophilic and hydrophobic backbone of N-vinylpyrrolidone-divinylbenzene, and with bonded sulfonic acid, quaternary amine, carboxylic acid, and piperazine groups, to achieve an excellent effect in the extraction of negatively and positively charged organics in water. However, the preparation process of related products is not disclosed.

Seed swelling polymerization is an important method to effectively combine a hydrophilic and hydrophobic backbone. Moreover, this method can also ensure the monodispersity of the prepared microspheres and thus effectively ensure the uniformity of the particle size of the packing. However, there are still some problems in the process of preparing hydrophilic and lipophilic materials by seed swelling polymerization. For example, as described in Chinese Patent Publication No. CN 102382227A, monodispersed microspheres of N-vinylpyrrolidone-divinylbenzene copolymer with uniform particle size is prepared by seed swelling polymerization. However, due to the strong hydrophilicity of N-vinylpyrrolidone, the ratio of N-vinylpyrrolidone participating in the swelling polymerization reaction cannot be controlled, and the obtained polymer microspheres are largely derived from the self-polymerization of hydrophobic substance divinylbenzene, so the product cannot be ensured to have good hydrophilicity: Moreover, it is not economical to use the product as a precursor to prepare a modified packing, and the extraction performance is poor. Therefore, how to prepare MCX, MAX, WCX, and WAX with uniform particle size is an important technical problem that needs to be solved urgently for the effective pretreatment of trace organics in water.

SUMMARY

1. Problem to be Solved

To overcome the defect that the ratio of the hydrophilic monomer N-vinylpyrrolidone participating in the swelling polymerization reaction cannot be controlled in the traditional seed swelling polymerization technology, a prepolymerization procedure is added before the secondary swelling polymerization, so that the hydrophilic substance, N-vinylpyrrolidone, forms a prepolymer micelle with the hydrophobic monomer divinylbenzene before participating in the final polymerization, and is allowed to have hydrophobicity and enter into the activator dibutyl phthalate (DBP) according to the theory of similarity and intermiscibility. As a result, the hydrophilic substance N-vinylpyrrolidone is well involved in the final polymerization reaction, and the full polymerization of the hydrophilic monomer N-vinylpyrrolidone with divinylbenzene is achieved, thus presenting a new solution of polymerization to amphiphilic resin microspheres.

Another object of the present invention is to provide a series of enhanced solid-phase extraction materials with uniform particle size successfully obtained according to the above preparation method.

Another object of the present invention is to provide use of the solid-phase extraction material, which has excellent effect in the detection or selective separation of acidic, alkaline, neutral and amphoteric trace pollutants in water.

2. Technical Solution

To solve the above problems, the following technical solutions are adopted in the present invention.

A method for preparing a solid-phase extraction material is provided, which comprises the steps of prepolymerizing monomers N-vinylpyrrolidone and divinylbenzene in the presence of a chain transfer agent, adding prepolymer dropwise into an emulsion of monodispersed seed microspheres, swelling, and reacting to prepare white spheres; and functionalizing the white spheres to obtain the solid-phase extraction material.

The idea underlying the preparation of the solid-phase extraction material in the present invention is as follows. Hydrophilic and lipophilic solid-phase extraction microspheres, that is, the white spheres, are synthesized, and then various groups with ion exchange performance are introduced on this basis, to prepare a series of solid-phase extraction packing. Through the modification of groups on the hydrophilic and lipophilic backbone, the performance of extracting the acidic, alkaline, neutral, and amphoteric substances is improved. The material of the present invention is suitable for the efficient enrichment and separation of hydrophilic organics.

In the seed swelling polymerization method in the prior art, to ensure a good spherization rate and yield, the secondary swelling is usually only applicable to monomers with strong hydrophobicity such as styrene and divinylbenzene. This is due to the fact that the monodispersed seed microspheres act as hydrophobic cores in water, to absorb the activator dibutyl phthalate (DBP), and further absorb the hydrophobic monomer involved in secondary swelling reaction by taking advantage of the hydrophobicity of DBP. This step is mainly based on the principle of similarity and intermiscibility. Finally, in the presence of the initiator and other substances, the monomers involved in the secondary swelling reaction are polymerized near the seed microspheres. This principle is not applicable to such substance as N-vinylpyrrolidone that is highly hydrophilic, because it is very readily soluble in water, and tends to dissolve in the aqueous phase rather than exists in the system as a separate oil phase during the swelling process. Therefore, it is difficult to be absorbed by the activated seed microspheres and participate in the polymerization in the vicinity through the principle of similarity and intermiscibility. Therefore, in the prior art, N-vinylpyrrolidone, a very hydrophilic monomer, is generally not used to prepare hydrophilic solid-phase extraction microspheres by swelling polymerization. In the present invention, a prepolymerization procedure is added before the secondary swelling polymerization, through which full polymerization of the hydrophilic monomer N-vinylpyrrolidone with the hydrophobic monomer is successfully achieved by adjusting the prepolymerization conditions to adjust the hydrophilicity of the prepolymerization product, to obtain a hydrophilic and lipophilic solid-phase extraction microsphere precursor (that is, white spheres) with a uniform particle size, a high yield and a good hydrophilicity. The hydrophilic and lipophilic solid-phase extraction microsphere precursor is further functionalized to prepare solid-phase extraction microspheres having various performances.

It should be noted that the white spheres refer to the hydrophilic and lipophilic solid-phase extraction microsphere precursor prepared by prepolymerizing the monomers N-vinylpyrrolidone and divinylbenzene in the presence of a chain transfer agent, adding the prepolymer dropwise to an emulsion of monodispersed seed microspheres, swelling, and reacting. The white spheres have not been functionalized.

Preferably, the white spheres have a static contact angle of 90° or less, preferably 85° or less, further preferably 80° or less, and still further preferably 75° or less.

Preferably, the particle size of the monodispersed seed microspheres is in the range of 1-15 μm.

Preferably, the prepolymerization specifically comprises: adding monomers N-vinylpyrrolidone and divinylbenzene, an emulsifier, a free radical initiator, and a chain transfer agent to an aqueous phase, and ultrasonically dispersing, to obtain an emulsion B; and prepolymerizing the emulsion B at a certain temperature.

Preferably, the weight ratio of the monomer N-vinylpyrrolidone to divinylbenzene is (1-81): 9.

Preferably, the amount of the emulsifier accounts for 0.1% to 20% based on the total weight of the monomers: the amount of the free radical initiator accounts for 0.5% to 4% based on the total weight of the monomers; and the molar ratio of the free radical initiator to the chain transfer agent is 1:(1-2.8).

Preferably, the weight ratio of the monomer N-vinylpyrrolidone to divinylbenzene in the prepolymerization process is 1:1: the amount of the initiator accounts for 2% based on the total weight of the monomers; and the molar ratio of the free radical initiator to the chain transfer agent is 1:1.

Preferably, the prepolymerization temperature of the emulsion B is 45-55° C.: the prepolymerization time of the emulsion B is 1-24 h: the swelling temperature is 0-30° C.; and the swelling time is 4-48 h.

Using a RAFT chain transfer agent, while the polymerization of the hydrophilic and hydrophobic monomers are controlled to progress smoothly, the formed amphiphilic micelles is allowed to swell and enter the vicinity of the seed microspheres to participate in the polymerization by adjusting the ratio of the hydrophilic and hydrophobic monomers, controlling the amount of the RAFT chain transfer agent added, and controlling the prepolymerization reaction conditions such as prepolymerization temperature and time. In this way, the solid-phase extraction microsphere precursor (white spheres) with uniform particle size are prepared.

Preferably, the preparation method specifically includes:

S1: preparation of monodispersed seed microspheres: mixing styrene and divinylbenzene at a certain ratio as an oil phase, mixing ethanol and water as an aqueous phase, adding a dispersant and a free radical initiator to the aqueous phase, and preparing monodispersed seed microspheres by dispersion polymerization; and adding the monodispersed seed microspheres to an aqueous phase containing a dispersant, and an emulsifier, adding a swelling agent, and a porogen, and ultrasonically dispersing to obtain an emulsion A;

S2: preparation of white spheres: adding the monomers N-vinylpyrrolidone and divinylbenzene, an emulsifier, a free radical initiator, and a chain transfer agent to an aqueous phase, and ultrasonically dispersing to obtain an emulsion B; and prepolymerizing the emulsion B at a certain temperature, adding dropwise into the emulsion A of monodispersed seed microspheres, swelling at a low temperature, heating gradually, reacting fully, discharging, washing, and drying to obtain white spheres; and S3: preparation of solid-phase extraction material: functionalizing the white spheres, to obtain the solid-phase extraction material.

Preferably, in step S1, the stirring speed in the dispersion polymerization is 100 to 1000 rpm, the heating rate in the dispersion polymerization is 1-10° C. per 10 minutes, and the reaction time is 4-12 h.

Preferably, in step S2, the emulsion B is prepolymerized at a certain temperature, added dropwise to the emulsion A of monodispersed seed microspheres, swollen at a low temperature, and heated gradually, where the rotational speed during the reaction is 100 to 800 rpm, the heating rate is 1-10° C. per 30 minutes, and the reaction time is 4-48 h.

Preferably, in step S1 or S2, the free radical initiator is one or more of azobisisobutyronitrile, azobisisoheptanenitrile, dimethyl azobisisobutyrate, azobisisobutyramidine hydrochloride, azobisisobutylimidazoline hydrochloride, dibenzoyl peroxide, and benzoyl peroxide: in step S1 or S2, the emulsifier is one or more of anionic emulsifier sodium dodecyl sulfate, sodium dodecylbenzenesulfonate, and fatty acid soaps; and/or in step S1, the dispersant is one or more of polyethylene glycol, sodium hexametaphosphate, fatty acid polyethylene glycol esters, and polyvinylpyrrolidone: the porogen is one or more of toluene, xylene, ethyl acetate, acetonitrile, tetrahydrofuran, acetone, and n-hexane.

Further preferably, the dispersant used in step S1 is polyvinylpyrrolidone: the emulsifier is sodium dodecyl sulfate, the initiator is azobisisobutyronitrile, and the porogen is toluene; and/or in step S1, the swelling agent is one or more of benzene, toluene, xylene, dichloroethane, trichloromethane, dimethyl phthalate, diethyl phthalate, and dibutyl phthalate;

in step S1, the weight ratio of water to ethanol in the aqueous phase is 15:85-85:15, preferably 40:60-60:40, and further preferably 50:50; and the weight ratio of the oil phase to the aqueous phase is 25:75-75:25, and preferably 25:75; and/or in step S1, the dispersant is added in an amount of 2%-10%, preferably 2%-5%, and further preferably 4% by weight of the monomers; and/or in step S1, the initiator is added in an amount of 0.5%-4%, preferably 0.5%-2%, and further preferably 1% by weight of the monomers; and/or in step S1, the temperature of the dispersion polymerization is controlled between 60 and 95° C.; and/or in step S1, the weight ratio of the monodispersed seed microspheres to the swelling agent is 1:2 to 1:10; and/or in step S1, the weight ratio of the swelling agent to the porogen is 1:1; and/or in step S1, the amount of the monodispersed seed microspheres in the emulsion A accounts for 1%-5% based on the total weight of the aqueous phase; and/or in step S1, the monodispersed seed microspheres are added to an aqueous phase containing a dispersant and an emulsifier, where the amounts of the dispersant and the emulsifier account for 0.2%-25% and 0.1%-20% by weight of the monodispersed seed microspheres respectively; and/or in step S2, the chain transfer agent is one or more of 2-[dodecylthio(thiocarbonyl)thio]-2-methylpropionic acid, isobutyronitrile dithiobenzoate, 2-cyanoprop-2-yl dithiobenzoate, S,S'-bis($\alpha,\alpha'$-dimethyl-$\alpha''$-acetic acid) trithiocarbonate, S,S'-p-($\alpha,\alpha'$-dimethyl-$\alpha''$-acetic acid) trithiocarbonate, and S-1-dodecyl-S' ($\alpha,\alpha'$-dimethyl-$\alpha''$-acetic acid) trithiocarbonate, and further preferably S,S'-bis($\alpha,\alpha'$-dimethyl-$\alpha''$-acetic acid)trithiocarbonate, S,S'-p-($\alpha,\alpha'$-dimethyl-$\alpha''$-acetic acid)trithiocarbonate or S-1-dodecyl-S' ($\alpha,\alpha'$-dimethyl-$\alpha''$-acetic acid) trithiocarbonate.

Preferably, the functionalization in step S3 includes a reaction with an aminating agent to prepare a strong or weak cation exchange solid-phase extraction material having an amine group, a reaction with an oxidant to prepare a weak anion exchange solid-phase extraction material having a carboxyl group, or a reaction with a sulfonating agent to prepare a strong anion exchange solid-phase extraction material having a sulfonic acid group.

Preferably, the reaction to prepare a strong or weak cation exchange solid-phase extraction material having an amine group may include preparing chloride spheres having a chloromethyl active group by using a chloromethylating agent, and then reacting an aminating agent with the chloride spheres to prepare a strong or weak cation exchange solid-phase extraction material having an amine group.

Preferably, the reaction to prepare a weak anion exchange solid-phase extraction material having a carboxyl group may include preparing chloride spheres having a chloromethyl active group by using a chloromethylating agent, and then reacting with an oxidant to prepare a weak anion exchange solid-phase extraction material having a carboxyl group.

Preferably, the reaction to prepare a strong anion exchange solid-phase extraction material having a sulfonic acid group may include directly reacting the white spheres with a sulfonating agent.

That is, the preparation of a solid-phase extraction material in S3 includes:

introducing a chloromethyl reactive group to the above white balls as a raw material, to obtain chloride spheres; and then substituting the chloromethyl group on the chloride spheres as a raw material with an amino group to obtain the strong or weak cation exchange solid-phase extraction material; or introducing a chloromethyl reactive group to the above white balls as a raw material, to obtain chloride spheres; and then oxidizing the chloromethyl group on the chloride spheres as a raw material to obtain a weak anion exchange solid-phase extraction material; or sulfonating the white spheres with a sulfonating agent, to obtain a strong anion exchange solid-phase extraction material.

The chloromethylating agent is one or more of chloromethyl ether, dichloromethyl ether, methoxyacetyl chloride, and chloromethyl alkyl ethers.

The aminating agent is one or more of diethylamine, triethylamine, dimethylamine, trimethylamine, dimethylbutylamine, N-methylimidazole, 1,2-ethylenediamine, and piperazine; and the weight ratio of the aminating agent to the chloride spheres is 1:1 to 100:1, and preferably 1:1 to 10:1.

The oxidant is one or more of hydrogen peroxide, potassium permanganate, and alumina; and the weight ratio of the oxidant to the chloride spheres is 1:1 to 50:1, and preferably 0.5:1 to 20:1.

The sulfonating agent is one or more of concentrated sulfuric acid, chlorosulfonic acid, and sulfamic acid; and the weight ratio of the sulfonating agent to the white spheres is 1:1 to 100:1, and preferably 1:1 to 10:1.

Preferably, in step S3, the rotational speed during the amination reaction is 100 to 800 rpm, the reaction temperature is 40-110° C., and the reaction time is 4-32 h.

Preferably, in step S3, the rotational speed during the oxidization reaction is 100 to 800 rpm, the reaction temperature is 50-150° C., and the reaction time is 3-24 h.

Preferably, in step S3, the rotational speed during the oxidization reaction is 100 to 800 rpm, the reaction temperature is 80-140° C., and the reaction time is 4-48 h.

The present invention further provides a solid-phase extraction material prepared by the above-mentioned method for preparing a solid-phase extraction material. The solid-phase extraction material includes a strong or weak cation exchange solid-phase extraction material having an amine group, a weak anion exchange solid-phase extraction material having a carboxyl group or a strong anion exchange solid-phase extraction material having a sulfonic acid group.

It should be noted that different types of solid-phase extraction materials have different functional groups, and can be used to selectively extract substances with different properties. For substances with pKa of <5.0, a weak cation exchange material can be used. For substances with pKa of 2<pKa<10, a strong anion exchange material can be used. An acid solution is added during the washing process, and the elution process consists of two steps, that is, a first step of eluting off and separating neutral substances using an organic solvent, and a second step of eluting with an organic solvent mixed with a base. For substances with pKa of >9, a weak anion exchange material can be selected. For substances with pKa of 2<pKa<10, a strong cation exchange material can be used. A base solution is added during the washing process, and the elution process consists of two steps, that is, a first step of eluting off and separating neutral substances using an organic solvent, and a second step of eluting with an organic solvent mixed with an acid.

The acid used in the washing process is one or more of formic acid, acetic acid, lactic acid, and oxalic acid, and the concentration of the acid is preferably 0.1%-25%. The organic eluent used in the elution process is one or more of methanol, acetonitrile, and ethyl acetate. The base used in the elution process is one or more of aqueous ammonia, dimethylamine, and trimethylamine, and the concentration of the base is preferably 0.1%-25%.

Preferably, the solid-phase extraction material has an average particle size of 5-100 μm, a specific surface area of 300-1000 $m^2/g$, and an exchange capacity of 0.1 to 5 mmol/g.

The present invention further provides use of the solid-phase extraction material in the extraction and enrichment of trace pollutants and charged pollutants in water.

3. Beneficial Effects

Compared with the prior art, the present invention has the following beneficial effects.

(1) The present invention provides a synthesis scheme in which the hydrophilic monomer is introduced into the oil phase through seed swelling to participate in the reaction, where an idea of smoothly prepolymerizing a hydrophilic monomer and a hydrophobic monomer in the presence of a RAFT chain transfer agent to form amphiphilic micelles to participate in swelling is adopted. This is a brand new solution in the art and solves the problem that it is difficult to use a hydrophilic monomer to prepare solid-phase extraction microspheres with uniform particle size through seed swelling in the prior art. Using the preparation method of the present invention, the white spheres prepared with a uniform particle size have a yield reaching 80% or more, and have good hydrophilicity, and high economic benefits.

(2) The static contact angle of the white spheres prepared in the present invention is less than 90°, in some embodiments, the static contact angle is less than 85°, in some embodiments, the static contact angle is less than 80°, and in some embodiments, the static contact angle is less than 75°. The white spheres also have good hydrophilicity and uniform particle size, thus being a good precursor for the subsequent preparation of solid-phase extraction microspheres.

(3) In the process of preparing solid-phase extraction microspheres by the reaction of white spheres in the present invention, the chloromethylation, amination, sulfonation, and oxidation reactions are relatively complete, no by-products are produced, and the reproducibility is good. The obtained solid-phase extraction microspheres have uniform particle size distribution, and are spheres having a particle size between 30-50 μm and having abundant pore structures on the sphere surface, which facilitates the mass transfer of substances. The specific surface area of the material is large and the ion exchange capacity is high.

(4) Each solid-phase extraction microsphere material prepared in the present invention has a high extraction rate for a corresponding substance, good data reproducibility, and high recyclablility.

DETAILED DESCRIPTION

Figure 1:
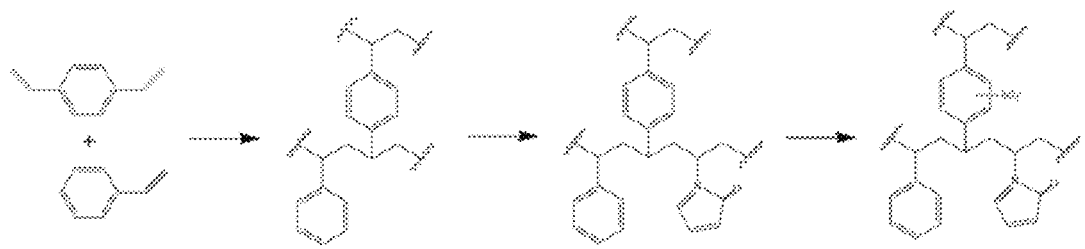
FIG. 1 shows the synthesis steps in Example 1 of the present invention.
Figure 1:
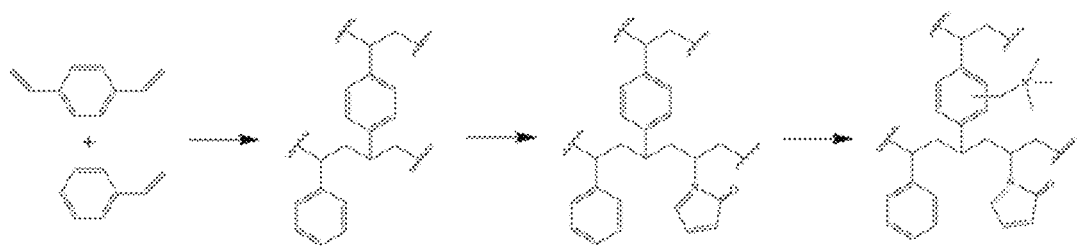
Figure 1:
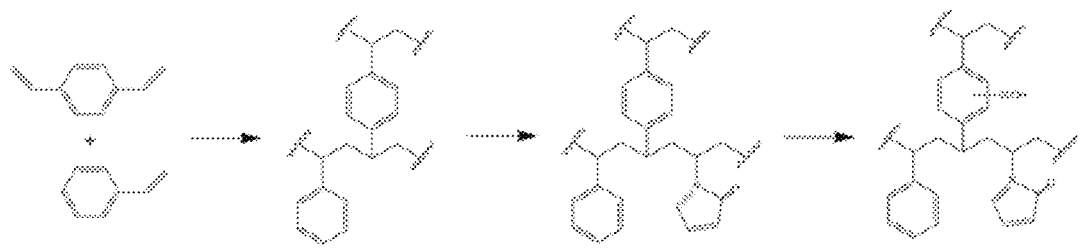
Figure 1:
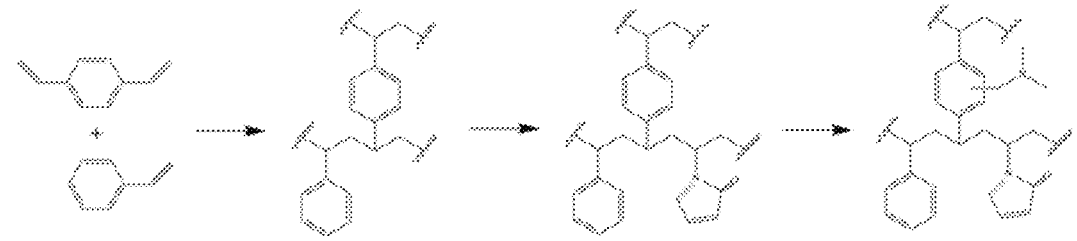
Figure 2:
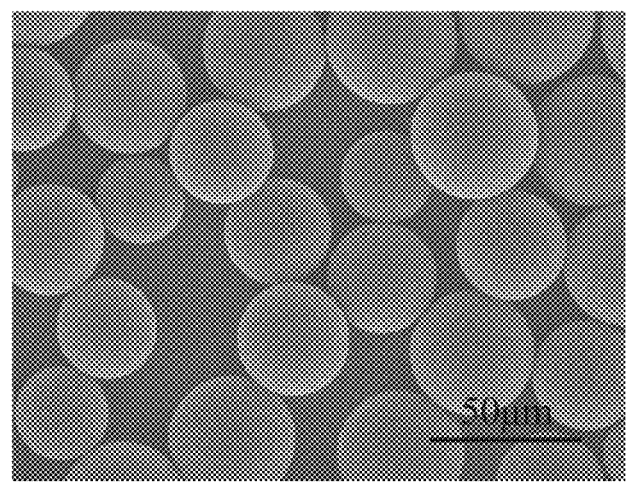
FIG. 2 shows a scanning electron microscopy (SEM) image of white spheres prepared in Example 1 of the present invention.
Figure 3:
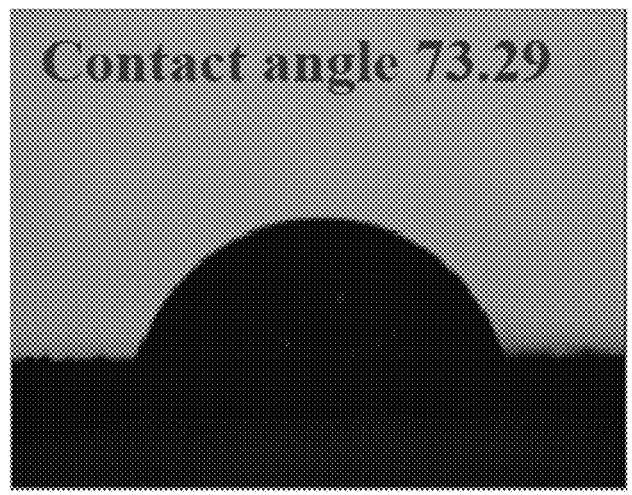
FIG. 3 shows the contact angle of white spheres in Example 1 of the present invention.
Figure 4:
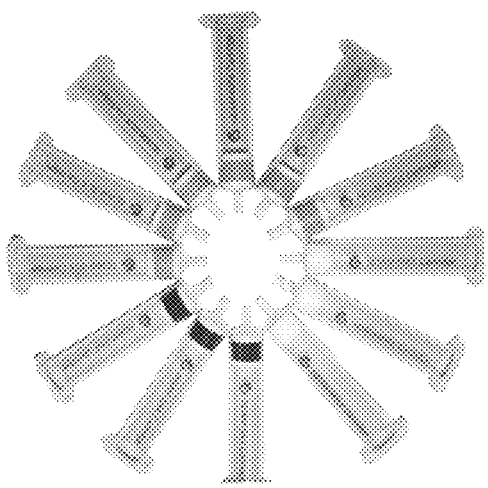
FIG. 4 is a photo showing the white sphere product in Example 1 of the present invention.

Unless otherwise defined, all technical and scientific terms used herein have the same meaning as commonly understood by those skilled in the technical field of the present invention. The term "and/or" as used herein includes any and all combinations of one or more related listed items.

No specific conditions are given in the examples, conventional conditions or conditions recommended by the manufacturer are followed. The agents or instruments for which no manufacturers are noted are all common products commercially available from the market.

As used herein, the term "about" is used to provide flexibility and imprecision related to a given term, metric, or value. Those skilled in the art can easily determine the degree of flexibility of specific variables.

Concentrations, temperatures, amounts and other values are presented in a range format herein. It should be understood that such a range format is used only for convenience and brevity, and should be flexibly interpreted as including not only the values explicitly stated as the limits of the range, but also all individual values or subranges covered within the range, as if each value and subrange are explicitly stated. For example, a numerical range of about 1 to about 4.5 should be interpreted as not only including the explicitly stated limit values of 1 to about 4.5, but also including individual numbers (such as 2, 3, 4) and subranges (such as 1 to 3, 2 to 4). The same principle applies to a range that only states one value, for example "less than about 4.5" should be interpreted as including all the above-mentioned values and ranges. In addition, the interpretation should apply regardless of the range or the breadth of features described.

The static contact angle in the present invention is measured by DSA100 contact angle meter.

The following further describes the present invention with reference to specific embodiments.

Example 1

(1) Preparation of monodispersed seed microspheres: 15 mL of ethanol and 15 mL of water were mixed as an aqueous phase, and then 0.4 g of the dispersant polyvinylpyrrolidone and 0.1 g of the initiator benzoyl peroxide were added to the aqueous phase, and stirred at 60° C. for 30 min until they are completely dissolved. 8 g of styrene and 2 g of divinylbenzene were mixed as an oil phase, and then gradually added dropwise to the aqueous phase. After mixing evenly, the system was gradually heated to 75° C. at a rate of 3° C. per 10 min. The stirring speed was kept between 450-500 rpm. After 4 h of reaction, monodispersed seed microspheres with a particle size of 5-10 μm were obtained.

To 100 mL of an aqueous solution, 0.5 g of the dispersant polyvinylpyrrolidone, 0.375 g of the emulsifier sodium lauryl sulfate, 2 g of the monodispersed seed microspheres, 10 g of the porogen toluene, and 10 g of the swelling agent dimethyl phthalate were added, and ultrasonically dispersed at 200 W to prepare an emulsion A.

(2) Preparation of white spheres with uniform particle size: The monomers for secondary polymerization, that is, 10 g of N-vinylpyrrolidone and 10 g of divinylbenzene, 0.375 g of the emulsifier sodium dodecyl sulfate, 0.4 g of the initiator benzoyl peroxide, and 0.46 g of the RAFT chain transfer agent S,S'-bis(α,α'-dimethyl-α"-acetic acid) trithiocarbonate were added to an aqueous phase and ultrasonically dispersed for 1 h at 200 W to prepare an emulsion B. The emulsion B was prepolymerized at 50° ° C. for 2 h, then added dropwise into the emulsion A, and allowed to swell at 30° C. for 24 h, during which the stirring speed was kept at 200 rpm. After swelling, the solution was heated to 80° ° C. at a rate of 5° C. per 30 min, and the reaction was stirred at 750 rpm for 24 h. After reaction, the solution was precipitated, and filtered. The precipitate was repeatedly rinsed with methanol and water, and dried under vacuum for a period of time, to obtain white spheres with uniform particle size.

As measured by DSA100 contact angle meter, the prepared white spheres have a static contact angle of 73.28°. The results of elemental analysis show that the N content in the white spheres is 2.13%: the particle size distribution is 30-50 μm, and the specific surface area is 300-1200 $m^2/g$.

(3) Preparation of enhanced solid-phase extraction material: 10 g of the white spheres was added to 50 mL of chloromethyl methyl ether, 3.5 g of ferric chloride was added as a catalyst, and a chloromethyl active group was introduced by reacting at 50° ° C. under an acidic condition for 12 h, to obtain chloride spheres.

An amount of chlorine spheres was added to trimethylamine at a weight ratio of 1:3, and reacted at 60° C. and 300 rpm for 24 h, to obtain a strong cation exchange solid-phase extraction material MAX.

An amount of chlorine spheres was added to dimethylamine at a weight ratio of 1:3, and reacted at 70° C. and 300 rpm for 24 h, to obtain a weak anion exchange solid-phase extraction material WAX.

An amount of white spheres was added to concentrated sulfuric acid at a weight ratio of 1:3, and reacted at 140° C. and 300 rpm for 8 h, to obtain a strong anion exchange solid-phase extraction material MCX.

An amount of chlorine spheres was added to hydrogen peroxide at a weight ratio of 1:3, and reacted at 80° C. and 300 rpm for 8 h, to obtain a weak cation exchange solid-phase extraction material WCX.

Example 2

Substances that are neutral at pH 7: nortriptyline (pKa-9.7), amitriptyline (pKa=9.4), and Triclosan (pKa-8.1); and acidic substances: ibuprofen (pKa=4.9), bezafibrate (pKa=3.6), and indomethacin (pKa-4.5) were used. The strong cation exchange solid-phase extraction material MAX prepared in Example 1 was employed.

(1) 500 mg of the solid-phase extraction material was fed to a 6 mL solid-phase extraction column with frit at both ends, appropriate amounts of the above agents were weighed respectively, and dissolved in methanol to prepare a 1 g/L standard stock solution. Appropriate amounts of the standard stock solutions were respectively pipetted and prepared into a 1 mg/L mixed standard solution for use. Also, a 1 mg/L mixed internal standard solution was prepared for use.

(2) The solid-phase extraction material was activated with 5 mL of methanol, and then washed with 5 mL of water. The mixed standard solution was passed through the solid-phase extraction column at a flow rate controlled to 10 mL/min. After that, the solid-phase extraction column was washed with 5 mL of 5% aqueous ammonia, to allow the acids to completely ionize, and be in an ionic state. The neutral and basic substances were then eluted off with 5 mL of a methanol solution. Finally, the acidic substances were eluted off with 5 mL of a 2% formic acid solution in methanol. The above eluates were blown to near dryness with a nitrogen blower, and then made up to 1 mL with acetonitrile.

(3) The substances were detected by ultra-high performance liquid chromatography-mass spectrometry, in which 0.1% (v/v) formic acid in water and acetonitrile were used as mobile phases for gradient elution, multiple reaction monitoring (MRM) was carried out in the electrospray positive ion mode, and the quantification was performed by the internal standard method. The recovery rates were all between 92.4% and 103.8%.

Commercial Oasis® MAX available from Waters was used for extraction. Under the same extraction and detection conditions, the recovery rates were all between 94.0% and 102.9%.

Example 3

Substances that are neutral at pH 7: acetaminophen (pKa=9.4) and Triclosan (pKa=8.14), amphoteric substance: ofloxacin (pKa=5.97, 9.28) and alkaline substances: clarithromycin (pKa=9.0), erythromycin (pKa=8.9), and omeprin (pKa-7.11) were used. The strong anion exchange solid-phase extraction material MCX prepared in Example 1 was employed.

(1) 500 mg of the solid-phase extraction material was fed to a 6 mL solid-phase extraction column with frit at both ends, appropriate amounts of the above agents were weighed respectively, and dissolved in methanol to prepare a 1 g/L standard stock solution. Appropriate amounts of the standard stock solutions were respectively pipetted and prepared into a 1 mg/L mixed standard solution for use. Also, a 1 mg/L mixed internal standard solution was prepared for use.

(2) The solid-phase extraction material was activated with 5 mL of methanol, and then washed with 5 mL of water. The mixed standard solution was passed through the solid-phase extraction column at a flow rate controlled to 10 mL/min. After that, the solid-phase extraction column was washed with 5 mL of 2% formic acid, to allow the alkaline substance to completely ionize, and be in an ionic state. The neutral and acidic substances were then eluted off with 5 mL of a methanol solution. Finally, the acidic substances were eluted off with 5 mL of a 5% ammonia solution in methanol. The above eluates were blown to near dryness with a nitrogen blower, and then made up to 1 mL with acetonitrile.

(3) The substances were detected by ultra-high performance liquid chromatography-mass spectrometry, in which 0.1% (v/v) formic acid in water and acetonitrile were used as mobile phases for gradient elution, multiple reaction monitoring (MRM) was carried out in the electrospray positive ion mode, and the quantification was performed by the internal standard method. The recovery rates were all between 89.2% and 103.1%.

Commercial Oasis® MCX available from Waters was used for extraction. Under the same extraction and detection conditions, the recovery rates were all between 84.4% and 98.9%.

Example 4

Substances that are neutral at pH 7: sulfaguanidine (pKa-2.22, 11.22), and acidic substances: ketoprofen (pKa-4.5) salicylic acid (pKa-3.0), and sulfamethoxazole (pKa=1.6, 5.7) were used. The weak cation exchange solid-phase extraction material WAX prepared in Example 1 was employed.

(1) 500 mg of the solid-phase extraction material was fed to a 6 mL solid-phase extraction column with frit at both ends, appropriate amounts of the above agents were weighed respectively, and dissolved in methanol to prepare a 1 g/L standard stock solution. Appropriate amounts of the standard stock solutions were respectively pipetted and prepared into a 1 mg/L mixed standard solution for use. Also, a 1 mg/L mixed internal standard solution was prepared for use.

(2) The solid-phase extraction material was activated with 5 mL of methanol, and then washed with 5 mL of water. The mixed standard solution was passed through the solid-phase extraction column at a flow rate controlled to 10 mL/min. After that, the solid-phase extraction column was washed with 5 mL of 2% formic acid, to allow the groups in the solid-phase extraction material to ionize, and be in an ionic state. The neutral and alkaline substances were then eluted off with 5 mL of a methanol solution. Finally, the acidic substances were eluted off with 5 mL of a 5% ammonia solution in methanol. The above eluates were blown to near dryness with a nitrogen blower, and then made up to 1 mL with acetonitrile.

(3) The substances were detected by ultra-high performance liquid chromatography-mass spectrometry, in which 0.1% (v/v) formic acid in water and acetonitrile were used as mobile phases for gradient elution, multiple reaction monitoring (MRM) was carried out in the electrospray positive ion mode, and the quantification was performed by the internal standard method. The recovery rates were all between 85.2% and 101.8%.

Commercial Oasis® WAX available from Waters was used for extraction. Under the same extraction and detection conditions, the recovery rates were all between 86.8% and 100.2%.

Example 5

Substances that are neutral at pH 7: chloramphenicol (pKa=11.0), carbamazepine (pKa=13.94), and florfenicol (pKa=10.73); and alkaline substances: amitriptyline (pKa=9.4), atenolol (pKa=9.6), and salbutamol (pKa=10.3) were used. The weak anion exchange solid-phase extraction material WCX prepared in Example 1 was employed.

(1) 500 mg of the solid-phase extraction material was fed to a 6 mL solid-phase extraction column with frit at both ends, appropriate amounts of the above agents were weighed respectively, and dissolved in methanol to prepare a 1 g/L standard stock solution. Appropriate amounts of the standard stock solutions were respectively pipetted and prepared into a 1 mg/L mixed standard solution for use. Also, a 1 mg/L mixed internal standard solution was prepared for use.

(2) The solid-phase extraction material was activated with 5 mL of methanol, and then washed with 5 mL of water. The mixed standard solution was passed through the solid-phase extraction column at a flow rate controlled to 10 mL/min. After that, the solid-phase extraction column was washed with 5 mL of 5% aqueous ammonia, to allow the groups in the solid-phase extraction material to ionize, and be in an ionic state. The neutral and acidic substances were then eluted off with 5 mL of a methanol solution. Finally, the alkaline substances were eluted off with 5 mL of a 2% formic acid solution in methanol. The above eluates were blown to near dryness with a nitrogen blower, and then made up to 1 mL with acetonitrile.

(3) The substances were detected by ultra-high performance liquid chromatography-mass spectrometry, in which 0.1% (v/v) formic acid in water and acetonitrile were used as mobile phases for gradient elution, multiple reaction monitoring (MRM) was carried out in the electrospray positive ion mode, and the quantification was performed by the internal standard method. The recovery rates were all between 91.9% and 105.2%.

Commercial Oasis® WCX available from Waters was used for extraction. Under the same extraction and detection conditions, the recovery rates were all between 91.6% and 104.6%.

Example 6

White spheres were prepared in this example. The conditions were the same as those in the preparation method of white balls in Example 1, except that the amount of the RAFT chain transfer agent S,S'-bis($\alpha,\alpha$'-dimethyl-$\alpha$"-acetic acid) trithiocarbonate added was 0.69 g.

The static contact angle of the white spheres prepared by this method is 79.71°, the N content is 1.10%, and the particle size distribution is 20-100 μm.

Example 7

White spheres were prepared in this example. The conditions were the same as those in the preparation method of white balls in Example 1, except that the amount of the RAFT chain transfer agent S,S'-bis($\alpha,\alpha$'-dimethyl-$\alpha$"-acetic acid) trithiocarbonate added was 0.92 g.

The static contact angle of the white spheres prepared by this method is 87.53°, the results of elemental analysis show that the N content is 0.9%, and the particle size distribution is 20-100 μm.

Example 8

White spheres were prepared in this example. The conditions were the same as those in the preparation method of white balls in Example 1, except that the amount of the RAFT chain transfer agent S,S'-bis($\alpha,\alpha$'-dimethyl-$\alpha$"-acetic acid) trithiocarbonate added was 1.15 g.

The static contact angle of the white spheres prepared by this method is 84.41°, the N content is 1.24%, and the particle size distribution is 20-200 μm.

Example 9

White spheres were prepared in this example. The conditions were the same as those in the preparation method of white balls in Example 1, except that the prepolymerization time of the emulsion B at 50° C. is 1 h.

The static contact angle of the white spheres prepared by this method is 89.87°, the N content is 0.77%, and the particle size distribution is 20-200 μm.

Example 10

White spheres were prepared in this example. The conditions were the same as those in the preparation method of white balls in Example 1, except that the prepolymerization time of the emulsion B at 50° C. is 3 h.

The static contact angle of the white spheres prepared by this method is 89.00°, the N content is 0.49%, and the particle size distribution is 20-200 μm.

Example 11

White spheres were prepared in this example. The conditions were the same as those in the preparation method of white balls in Example 1, except that the RAFT chain transfer agent is S-1-dodecyl-S' (α,α'-dimethyl-α"-acetic acid) trithiocarbonate (0.46 g).

The static contact angle of the white spheres prepared by this method is 84.00°, the N content is 1.55%, and the particle size distribution is 20-200 μm.

Example 12

White spheres were prepared in this example. The conditions were the same as those in the preparation method of white balls in Example 1, except that the RAFT chain transfer agent is S,S'-p-(α,α'-dimethyl-α"-acetic acid)trithiocarbonate (0.46 g).

The static contact angle of the white spheres prepared by this method is 84.89°, the N content is 0.49%, and the particle size distribution is 20-200 μm.

Comparative Example 1

White spheres were prepared in this comparative example. The conditions were the same as those in the preparation method of white balls in Example 1, except that the RAFT chain transfer agent is cyanomethyl N-methyl-N-phenyl-dithiocarbamate (0.46 g).

The static contact angle of the white spheres prepared by this method is 96.06°, the N content is 0.22%, and the particle size distribution is 1-200 μm. The contact angle is greater than 90°, and is a hydrophobic contact angle; and the N content is very low; so the obtained polymer microspheres are largely derived from the self-polymerization of hydrophobic substance divinylbenzene, the hydrophilic substance N-vinylpyrrolidone is not well involved in the polymerization, and the reaction is failed.

Comparative Example 2

White spheres were prepared in this comparative example. The conditions were the same as those in the preparation method of white balls in Example 1, except that the prepolymerization temperature of the emulsion B is 40° C.

The static contact angle of the white spheres prepared by this method is 108.33°, the N content is 0, and the particle size distribution is 1-200 μm. The contact angle is greater than 90°, and is a hydrophobic contact angle: the N content is 0, so the obtained polymer microspheres are much largely derived from the self-polymerization of hydrophobic substance divinylbenzene, the hydrophilic substance N-vinylpyrrolidone is not involved in the polymerization, and the reaction is failed.

Comparative Example 3

White spheres were prepared in this comparative example. The conditions were the same as those in the preparation method of white balls in Example 1, except that the prepolymerization temperature of the emulsion B is 60° C.

The static contact angle of the white spheres prepared by this method is 107.08°, the N content is 0, and the particle size distribution is 1-200 μm. The contact angle is greater than 90°, and is a hydrophobic contact angle; and the N content is 0, so the obtained polymer microspheres are much largely derived from the self-polymerization of hydrophobic substance divinylbenzene, the hydrophilic substance N-vinylpyrrolidone is not involved in the polymerization, and the reaction is failed.

Comparative Example 4

White spheres were prepared in this example. The conditions were the same as those in the preparation method of white balls in Example 1, except that the amount of the RAFT chain transfer agent is S,S'-bis(α,α'-dimethyl-α"-acetic acid) trithiocarbonate added is 0.23 g.

The static contact angle of the white spheres prepared by this method is 99.52°, the N content is 0.47%, and the particle size distribution is 1-200 μm. The contact angle is greater than 90°, and is a hydrophobic contact angle; and the N content is very low; so the obtained polymer microspheres are much largely derived from the self-polymerization of hydrophobic substance divinylbenzene, the hydrophilic substance N-vinylpyrrolidone is not well involved in the polymerization, and the reaction is failed.

Comparative Example 5

(1) Preparation of monodispersed seed microspheres: 15 mL of ethanol and 15 mL of water were mixed as an aqueous phase, and then 0.4 g of the dispersant polyvinylpyrrolidone and 0.1 g of the initiator benzoyl peroxide were added to the aqueous phase, and stirred at 60° C. for 30 min until they are completely dissolved. 8 g of styrene and 2 g of divinylbenzene were mixed as an oil phase, and then gradually added dropwise to the aqueous phase. After mixing evenly, the system was gradually heated to 75° ° C. at a rate of 3° C. per 10 min. The stirring speed was kept between 450-500 rpm. After 4 h of reaction, monodispersed seed microspheres with a particle size of 5-10 μm were obtained.

To 100 mL of an aqueous solution, 0.5 g of the dispersant polyvinylpyrrolidone, 0.375 g of the emulsifier sodium lauryl sulfate, 2 g of the monodispersed seed microspheres, 10 g of the porogen toluene, and 10 g of the swelling agent dimethyl phthalate were added, and ultrasonically dispersed at 200 W to prepare an emulsion A.

(2) Preparation of white spheres with uniform particle size: The monomers for secondary polymerization, that is, 10 g of N-vinylpyrrolidone and 10 g of divinylbenzene, 0.375 g of the emulsifier sodium lauryl sulfate, and 0.4 g of the initiator benzoyl peroxide were added to an aqueous phase and ultrasonically dispersed for 1 h at 200 W to prepare an emulsion B. The emulsion B was added dropwise to the emulsion A, during which the stirring speed was kept at 200 rpm. After swelling, the solution was heated to 80° C. at a rate of 5° C. per 30 min, and the reaction was stirred at 750 rpm for 24 h. After reaction, the solution was precipitated, and filtered. The precipitate was repeatedly rinsed with methanol and water, and dried under vacuum for a period of time, to obtain white spheres with uniform particle size.

The white spheres prepared by this method (without prepolymerization) have a static contact angle of 100.97°, the N content is 0, and the particle size distribution is 1-200 μm. The contact angle is greater than 90°, and is a hydrophobic contact angle; and the N content is 0, so the obtained polymer microspheres are largely derived from the self-polymerization of hydrophobic substance divinylbenzene, the hydrophilic substance N-vinylpyrrolidone is not involved in the polymerization, and the reaction is failed.

The foregoing content provides exemplary descriptions of the present invention and implementations thereof, the descriptions are not limitative, the implementations shown in the embodiments are merely some implementations of the present invention, and actual implementations are not limited thereto. Therefore, inspired by the implementations, all implementations and embodiments similar to the technical solution and designed by a person of ordinary skill in the art without departing from the creation purpose of the present invention and without creative efforts shall fall within the protection scope of the present invention.

What is claimed is:

1. A method for preparing a solid-phase extraction material, comprising:
   preparing an emulsion A of monodispersed seed microsphere;
   performing prepolymerization reaction based on monomers N-vinylpyrrolidone and divinylbenzene in the presence of a chain transfer agent; and
   adding a product of the prepolymerization reaction dropwise into the emulsion A of monodispersed seed microspheres to obtain a mixture, swelling the mixture and allowing it to react to form white spheres, and functionalizing the white spheres to obtain the solid-phase extraction material;
   wherein performing the prepolymerization reaction comprises:
   mixing the monomers N-vinylpyrrolidone and divinylbenzene, an emulsifier, a free radical initiator, and a chain transfer agent, and ultrasonically dispersing them in an aqueous phase to form an emulsion B; and
   performing the prepolymerization reaction on the emulsion B at a temperature in a range of 45° C. to 55° C.,
   wherein a molar ratio of the free radical initiator to the chain transfer agent is 1: (1-2.8), and
   wherein the chain transfer agent is one or more of S,S'-bis(α,α'-dimethyl-α"-acetic acid) trithiocarbonate, S,S'-p-(α,α'-dimethyl-α"-acetic acid) trithiocarbonate, and S-1-dodecyl-S' (α,α'-dimethyl-α"-acetic acid) trithiocarbonate.

2. The method for preparing a solid-phase extraction material according to claim 1, wherein a weight ratio of the monomers N-vinylpyrrolidone to divinylbenzene is (1-81): 9.

3. The method for preparing a solid-phase extraction material according to claim 1, wherein the amount of the emulsifier accounts for 0.1% to 20% based on the total weight of the monomers N-vinylpyrrolidone; the amount of the free radical initiator accounts for 0.5% to 4% based on the total weight of the monomers N-vinylpyrrolidone.

4. The method for preparing a solid-phase extraction material according to claim 1, wherein a prepolymerization reaction time of the emulsion B is 1 h-24 h; a swelling temperature is 0-30° C.; and a swelling time is 4 h-48 h.

5. The method for preparing a solid-phase extraction material according to claim 4, comprising:
   S1: preparing the emulsion A of the monodispersed seed microspheres: mixing styrene and divinylbenzene as an oil phase, mixing ethanol and water as an aqueous phase, adding a dispersant and a free radical initiator to the aqueous phase, and preparing the monodispersed seed microspheres by dispersion polymerization; and then adding the monodispersed seed microspheres to the aqueous phase containing the dispersant and an emulsifier, and mixing a swelling agent and a porogen and ultrasonically dispersing them in the aqueous phase to obtain the emulsion A;
   S2: performing the prepolymerization reaction: mixing the monomers N-vinylpyrrolidone and divinylbenzene, the emulsifier, the free radical initiator, and the chain transfer agent and ultrasonically dispersing them to obtain the emulsion B; and performing the prepolymerization reaction on the emulsion B at the temperature in the range of 45° C. to 55° C. to obtain the product of the prepolymerizaiton reaction;
   S3: forming the white spheres: adding the product of the prepolymerization reaction dropwise into the emulsion A to obtain the mixture, swelling the mixture at a temperature in a range of 0 to 30° C., and heating, reacting, discharging, washing, and drying the mixture to obtain the white spheres; and
   S4: obtaining the solid-phase extraction material: functionalizing the white spheres to obtain the solid-phase extraction material.

6. The method for preparing a solid-phase extraction material according to claim 1, comprising:
   S1: preparing the emulsion A of the monodispersed seed microspheres: mixing styrene and divinylbenzene as an oil phase, mixing ethanol and water as an aqueous phase, adding a dispersant and a free radical initiator to the aqueous phase, and preparing the monodispersed seed microspheres by dispersion polymerization; and adding the monodispersed seed microspheres to the aqueous phase containing a dispersant, and an emulsifier, and mixing a swelling agent and a porogen and ultrasonically dispersing them to obtain the emulsion A;
   S2: performing the prepolymerization reaction: adding the monomers N-vinylpyrrolidone and divinylbenzene, the emulsifier, the free radical initiator, and the chain transfer agent to the aqueous phase and ultrasonically dispersing them to obtain the emulsion B; and performing the prepolymerization reaction on the emulsion B at the temperature in the range of 45° C. to 55° C. to obtain the product of the prepolymerizaiton reaction;
   S3: forming the white spheres: adding the product of the prepolymerization reaction dropwise into the emulsion A to obtain the mixture, and swelling the mixture and heating, reacting, discharging, washing, and drying the mixture to obtain the white spheres; and
   S4: obtaining the solid-phase extraction material: functionalizing the white spheres to obtain the solid-phase extraction material.

7. The method for preparing a solid-phase extraction material according to claim 6, wherein
   in step S1 or S2, the free radical initiator is one or more of azobisisobutyronitrile, azobisisoheptanenitrile, dimethyl azobisisobutyrate, azobisisobutyramidine hydrochloride, azobisisobutylimidazoline hydrochloride, dibenzoyl peroxide, and benzoyl peroxide; and/or
   in step S1 or S2, the emulsifier is one or more of anionic emulsifier sodium dodecyl sulfate, sodium dodecylbenzenesulfonate, and fatty acid soaps; and/or
   in step S1, the dispersant is one or more of polyethylene glycol, sodium hexametaphosphate, fatty acid polyethylene glycol esters, and polyvinylpyrrolidone; the porogen is one or more of toluene, xylene, ethyl acetate, acetonitrile, tetrahydrofuran, acetone, and n-hexane; and/or
   in step S1, the swelling agent is one or more of benzene, toluene, xylene, dichloroethane, trichloromethane, dimethyl phthalate, diethyl phthalate, and dibutyl phthalate; and/or in step S1, a weight ratio of water to ethanol in the aqueous phase is (15:85) to (85:15), a weight ratio of the oil phase to the aqueous phase is (25:75) to (75:25); and/or in step S1, the dispersant is added in an amount of 2%-10% by weight of the monomers; and/or in step S1, the free radical initiator is added in an amount of 0.5%-4% by weight of the monomers; and/or in step S1, a temperature of the dispersion polymerization is controlled between 6° and 95° C.; and/or in step S1, a weight ratio of the monodispersed seed microspheres to the swelling agent is (1:2) to (1:10); and/or in step S1, a weight ratio of the swelling agent to the porogen is 1:1; and/or in step S1, an amount of the monodispersed seed microspheres in the emulsion A accounts for 1%-5% based on the total weight of the aqueous phase; and/or in step S1, the monodispersed seed microspheres are added to the aqueous phase containing the dispersant and the emulsifier, wherein amounts of the dispersant and the emulsifier account for 0.2%-25% and 0.1%-20% by weight of the monodispersed seed microspheres respectively.

8. The method for preparing a solid-phase extraction material according to claim 7, wherein in step S4, the functionalizing comprises a reaction with an aminating agent to prepare a strong or weak cation exchange solid-phase extraction material having an amine group, a reaction with an oxidant to prepare a weak anion exchange solid-phase extraction material having a carboxyl group, or a reaction with a sulfonating agent to prepare a strong anion exchange solid-phase extraction material having a sulfonic acid group, wherein the aminating agent is one or more of diethylamine, triethylamine, dimethylamine, trimethylamine, dimethylbutylamine, N-methylimidazole, 1,2-ethylenediamine, and piperazine;

the oxidant is one or more of hydrogen peroxide, potassium permanganate, and alumina;

the sulfonating agent is one or more of concentrated sulfuric acid, chlorosulfonic acid, and sulfamic acid.

9. A solid-phase extraction material prepared by the method for preparing a solid-phase extraction material according to claim 1, comprising a strong or weak cation exchange solid-phase extraction material having an amine group, a weak anion exchange solid-phase extraction material having a carboxyl group or a strong anion exchange solid-phase extraction material having a sulfonic acid group.

10. Use of the solid-phase extraction material according to claim 9 in extraction and enrichment of trace pollutants and charged pollutants in water.

* * * * *